(12) United States Patent
Will et al.

(10) Patent No.: US 11,477,200 B2
(45) Date of Patent: Oct. 18, 2022

(54) METHODS AND SYSTEMS FOR IP-BASED NETWORK INTRUSION DETECTION AND PREVENTION

(71) Applicant: TD Ameritrade IP Company, Inc., Omaha, NE (US)

(72) Inventors: Bradley Scott Will, Marriottsville, MD (US); Michael John Serafino, Omaha, NE (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 439 days.

(21) Appl. No.: 16/589,028

(22) Filed: Sep. 30, 2019

(65) Prior Publication Data

US 2021/0099451 A1   Apr. 1, 2021

(51) Int. Cl.
*H04L 9/40* (2022.01)
(52) U.S. Cl.
CPC ........ *H04L 63/101* (2013.01); *H04L 63/0876* (2013.01); *H04L 63/108* (2013.01)
(58) Field of Classification Search
None
See application file for complete search history.

(56) References Cited

U.S. PATENT DOCUMENTS

| | | | |
|---|---|---|---|
| 2015/0181021 A1* | 6/2015 | Fry | G06Q 50/30 455/406 |
| 2015/0288715 A1* | 10/2015 | Hotchkiss | H04L 63/0876 726/7 |
| 2018/0278584 A1* | 9/2018 | Kuperman | G06F 21/602 |
| 2019/0166128 A1* | 5/2019 | Kurian | H04L 63/12 |
| 2019/0253451 A1* | 8/2019 | Maxwell | G06F 21/46 |
| 2020/0213334 A1* | 7/2020 | Kutner | H04L 63/101 |

FOREIGN PATENT DOCUMENTS

WO   WO-2016058631 A   *   4/2016   ........... H04L 63/101

* cited by examiner

*Primary Examiner* — Arezoo Sherkat

(57) ABSTRACT

An authentication system includes an authentication module maintaining a store of credentials for a set of users. In response to an identity specified by credentials provided from a requestor address not being found in the store of credentials, the authentication module transmits an authentication failure response. In response to the provided credentials matching selected credentials, the authentication module transmits an authentication success response. The authentication system includes an analyzer module configured to determine a number of identity-not-found failures corresponding to a first address, identify a triggering event in response to the number exceeding a predetermined threshold, and, in response to the triggering event, add the first address to a block list. The authentication system includes a query module configured to, in response to a query for a specified address, determine whether the specified address is present in the block list and, if so, instruct transmission of the authentication failure response.

26 Claims, 7 Drawing Sheets

METHODS AND SYSTEMS FOR IP-BASED NETWORK INTRUSION DETECTION AND PREVENTION

FIELD

The present disclosure relates to systems and methods for analyzing network data and more particularly to systems and methods for detecting and preventing network intrusions.

BACKGROUND

We live in an era where large-scale data breaches have become far too commonplace. In the last ten years, hackers have compromised many big-name companies. Although it is commonly recommended, including by NIST (National Institute of Science and Technology), that companies salt and one-way hash passwords prior to storage, many firms have not implemented those recommendations. As such, when a firm is hacked and their customer passwords get into the attacker's hands, they often find a treasure trove of plain-text or easily cracked passwords. In other situations, hackers may compromise a site and harvest passwords prior to them being hashed. The website haveibeenpwned.com reports that there are currently over 551 million unique passwords that have been acquired through hundreds of data breaches.

Users frequently re-use the same user ID (or username) and password across many or all of their digital accounts. Remembering unique, random passwords of sufficient complexity is impossible for most humans across more than a handful of accounts.

Hackers understand this primal instinct and prey upon it. When user IDs and passwords from a breach are made available on the Dark Web, hackers use scripts that post credentials one-at-a-time to a targeted company's website. These attacks are typically referred to as "credential replay" or "credential stuffing" attacks, and they typically use the same publicly available front doors—websites and application programming interfaces (APIs)—that customers use. Replay attacks will post the breached credentials until they find a pair that elicits a different response other than a failure. Volume also does not matter in these types of attacks. Even if only 100 credentials are successful in a replay of 1,000,000, the attackers still identified valid credentials for 100 customers. For financial services firms, these attacks can be extremely disruptive and seriously damage the customer's financial well-being in addition to the trust relationship with the financial services firm.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An authentication system includes an authentication module configured to maintain a store of credentials for a set of users and receive an authentication request from a requestor address. The authentication module is configured to, in response to an identity specified by credentials provided from the requestor address not being found in the store of credentials, transmit an authentication failure response to the requestor address and record a failure event in an event cache. The failure event indicates the requestor address and indicates an identity-not-found failure mode. The authentication module is configured to, in response to the provided credentials matching selected credentials in the store of credentials, selectively transmit an authentication success response to the requestor address. The authentication system includes an analyzer module configured to analyze events in the event cache to determine a number of identity-not-found failures corresponding to a first address, identify a triggering event in response to the number of identity-not-found failures exceeding a predetermined threshold, and, in response to the triggering event, add the first address to a block list. The authentication system includes a query module configured to, in response to a query from the authentication module for a specified address, determine whether the specified address is present in the block list and, in response to the specified address being present in the block list, instruct the authentication system to transmit the authentication failure response to the requestor address.

In other features, the provided credentials include a username and a hash of a password. The username specifies the identity for the provided credentials. In other features, the number of identity-not-found failures related to the first address is restricted to those occurring in a predetermined period of time prior to the analysis. In other features, the predetermined threshold and the predetermined period of time are configurable by an administrator. In other features, the analyzer module is configured to specify an expiration time when adding the first address to the block list and, in response to the expiration time being reached, remove the first address from the block list.

In other features, the expiration time is based on a sum of a time of the triggering event and a configurable block length. In other features, the authentication module is configured to, in response to the provided credentials matching the selected credentials, record a success event in the event cache. The success event includes the identity.

In other features, the failure event indicates the identity. The analyzer module is configured to analyze events in the event cache to determine a number of unique identities presented by the first address and selectively identify the triggering event in response to the number of unique identities exceeding a second predetermined threshold. In other features, the analyzer module is configured to analyze events in the event cache to determine a number of unique identities presented by the first address within a predetermined time period and identify the triggering event in response to the number of unique identities within the predetermined time period exceeding the second predetermined threshold.

In other features, the authentication module is configured to, in response to the identity specified by the provided credentials being found in the store of credentials but the provided credentials failing to match any of the store of credentials, transmit the authentication failure response to the requestor address and record the failure event in the event cache. The failure event indicates the requestor address and indicates a credential failure mode. The analyzer module is configured to analyze events in the event cache to determine a number of total failures corresponding to the first address and identify the triggering event in response to the number of total failures exceeding a second predetermined threshold. In other features, the analyzer module is configured to reduce the predetermined threshold for the first address in response to the first address having been previously blocked.

An authentication method includes maintaining a store of credentials for a set of users and receiving an authentication request from a requestor address. The method includes, in response to an identity specified by credentials provided from the requestor address not being found in the store of credentials, transmitting an authentication failure response to the requestor address and recording a failure event in an event cache. The failure event indicates the requestor address and indicates an identity-not-found failure mode. The method includes, in response to the provided credentials matching selected credentials in the store of credentials, selectively transmitting an authentication success response to the requestor address. The method includes analyzing events in the event cache to determine a number of identity-not-found failures corresponding to a first address. The method includes identifying a triggering event in response to the number of identity-not-found failures exceeding a predetermined threshold. The method includes, in response to the triggering event, adding the first address to a block list. The method includes, in response to a query for a specified address, determining whether the specified address is present in the block list and, in response to the specified address being present in the block list, instructing the authentication method to transmit the authentication failure response to the requestor address.

In other features, the provided credentials include a username and a hash of a password. the username specifies the identity for the provided credentials. In other features, the number of identity-not-found failures related to the first address is restricted to those occurring in a predetermined period of time prior to the analysis. The predetermined threshold and the predetermined period of time are configurable by an administrator.

In other features, the authentication method includes specifying an expiration time when adding the first address to the block list and, in response to the expiration time being reached, removing the first address from the block list. In other features, the expiration time is based on a sum of a time of the triggering event and a configurable block length. In other features, the authentication method includes, in response to the provided credentials matching the selected credentials, recording a success event in the event cache. The success event includes the identity.

In other features, the failure event indicates the identity. The method includes analyzing events in the event cache to determine a number of unique identities presented by the first address within a predetermined time period and identifying the triggering event in response to the number of unique identities presented within a predetermined time period exceeding a second predetermined threshold.

In other features, the authentication method includes, in response to the identity specified by the provided credentials being found in the store of credentials but the provided credentials failing to match any of the store of credentials, transmitting the authentication failure response to the requestor address and recording the failure event in the event cache. The failure event indicates the requestor address and indicates a credential failure mode. The method includes analyzing events in the event cache to determine a number of total failures corresponding to the first address and identifying the triggering event in response to the number of total failures exceeding a second predetermined threshold. In other features, the authentication method includes reducing the predetermined threshold for the first address in response to the first address having been previously blocked.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
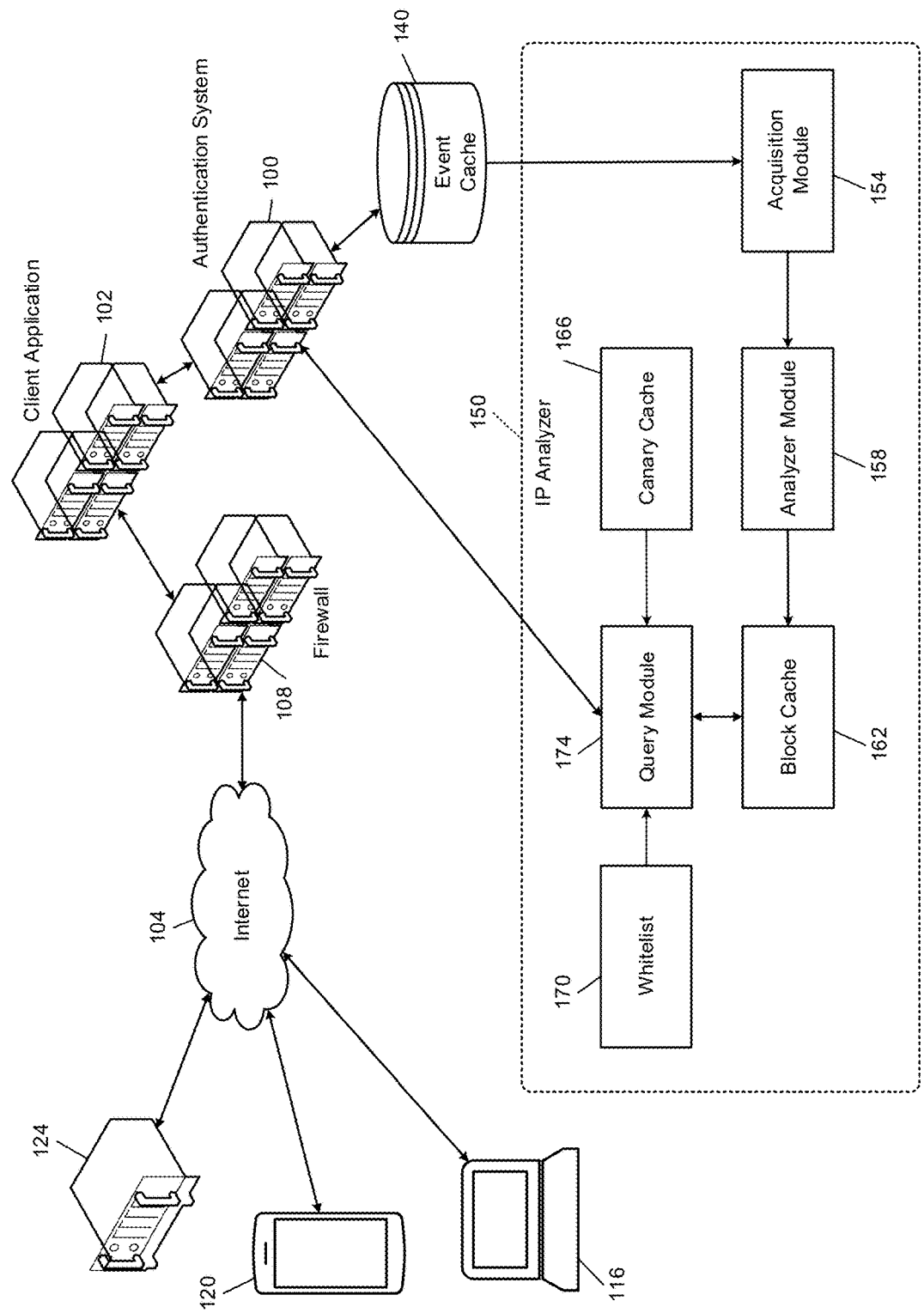
FIG. 1 is a functional block diagram of an example authentication environment according to the principles of the present disclosure.

The present disclosure describes a unique and computationally efficient approach to identifying "credential stuffing" attacks in which attackers present username-password pairs obtained elsewhere in an attempt to unlawfully obtain access. Once an attack is identified from a particular Internet Protocol (IP) address, a system according to the principles of the present disclosure can apply a variety of levels of remedial action to requests from that IP address.

For example, remedial action may include blocking access by the IP address altogether. This runs the risk of preventing legitimate access by a user in the event of a false positive. Therefore, instead of (or prior to) blocking access outright, the system may impose a more burdensome or thorough login process. For example, the system may force the user to go through a Completely Automated Public Turing test to tell Computers and Humans Apart (CAPTCHA) process. The CAPTCHA process may create mild irritation for a user but will create substantial difficulty for an attacker attempting to submit a large volume of credentials.

Another way of making the login process more thorough is to force a second factor to be presented. If the user has not explicitly requested multi-factor authentication, but has provided a cell phone number or email, the system may indicate to the user that a secret code is being sent to one of those destinations. The user can only gain access once they receive and present the secret code. While this may slow access by the user, it is preferable in the case of a legitimate user to blocking access outright.

As mentioned above, detection of an attack may lead to all access by the particular IP address being blocked. Blocking the IP address at the firewall so that authentication cannot be attempted will immediately notify the attacker that the IP address has been compromised. The attacker will likely simply move to a new IP address. For example, the attacker may have many network nodes in a botnet at their disposal.

Therefore, the present disclosure describes a more subtle approach to blocking access by the IP address of the attacker. The system can still identify whether a username-password pair (or other form of credentials) matches with stored credentials. However, instead of responding with an indication of success when there is a match, the system can always respond to the attacker with a failure. In this way, the attacker may be fooled into believing that their entire set of credentials failed to work for accessing the system. Meanwhile, the system can identify whether any provided credentials are valid. If so, the corresponding account can be flagged as compromised and the real user notified. Additional precautionary measures may be taken. For example, in the case of a financial institution, all withdrawals from that account may be suspended until a legitimate user can be identified and new (hopefully, more secure) credentials can be stored.

In various implementations, the system may attempt to create false positives for the attacker. In other words, the system may return a successful authentication result even when authentication was not successful. If an attacker submits 10,000 sets of credentials and 5,000 of them are indicated as working even though the actual number of working credentials is 20-30, the attacker will not be able to trust their results. The attacker might then have to manually attempt to enter each of the supposedly successful sets of credentials, which diminishes the return on investment of the credential stuffing attack. This measure will make the system a less attractive target for credential stuffing attacks.

Another consideration is that a sophisticated attacker may create a legitimate account within the system and include that account's credentials within their attack. In this way, the attacker can identify that their access has been blocked by the fact that a set of known good credentials fails. As a result, the system may monitor for patterns indicative of a "canary" account and, when such an account is presented, provide an authentication success for that account.

The various triggering criteria for identifying an attack may be defined by a predetermined set of thresholds and time periods or may be defined by one or more rule sets written in a certain rule syntax. For example, a rule set may define what sort of events are analyzed, what parameters about those events is analyzed (for example, total # of submissions per minute or standard deviation of the intervals between each submission), and what thresholds are relevant to the analysis. A rule set may establish a starting point from which a machine learning algorithm may attempt to optimize to allow earlier detection of actual attacks and reduced detection of short bursts of non-attack activity. The machine learning algorithm may receive feedback from a fraud detection or computer security department of the system, which may analyze logs to determine whether identified attacks were truly attacks or actually false positives.

In various implementations, the system may be configured with a predetermined set of triggering events used to identify attacks. Each one of these triggers may be enabled or disabled by administrators, and salient parameters of each trigger may be configurable. For example, an authentication failure trigger may identify an attack when a predetermined number of failed login attempts are received from a single IP address. That predetermined number may be restricted to within a certain time window. For example, the trigger may occur when 240 failed login attempts arrive from a certain IP address within the prior 15 minutes.

Another type of trigger is based on identity not found failures, which occur when the presented username (for example, an email address) is not a valid username. This trigger may be set such that attacks are identified once 32 identity-not-found failures are received from the same IP address in the space of the last 10 minutes.

A further type of trigger may be defined as more than a predetermined number of unique values for user identity being received within a predetermined period of time. For example, the trigger may identify an attack if 200 unique identities are presented by a single IP address in the preceding three minutes.

Once a triggering event for an attack is detected, the IP address may be blocked for a period of time, such as four hours. When the IP address is blocked, responses will be returned to the user indicating that the asserted identifying information has failed to match. This effectively blocks access from the triggering IP Address for some predetermined amount of time. The trigger analysis may be performed on a continual basis or on a periodic basis, such as once every 60 seconds. Each of these values may be configurable.

In various implementations, as described below, multiple thresholds may be defined and different remedial actions chosen for each threshold. For example, if the number of failed login attempts exceeds a first threshold, CAPTCHA may be required. If a second, higher threshold is exceeded, a second authentication factor may be required. And if a third, still-higher threshold is exceeded, all access from that IP address will be blocked. Each one of these remedial actions may be associated with its own duration or they may all share a duration, such as four hours. Note that each time a triggering event is identified, the duration is extended. In other words, the block (or other action) will extend for the full duration (such as four hours) from the last instance of a triggering event on that IP address.

The approach in the present disclosure does not rely on a browser user agent string or any other type of browser fingerprint. As a result, spoofing of the user agent by an attacker will not fool the present system. Further, the present system can accommodate authentication attempts from a variety of platforms, including browser, mobile application, application programming interface (API), etc.

Instead, the present disclosure describes how to perform blocking (and other remedial actions) based on an IP address, which is an inherent part of TCP/IP and is immutable in some respects. Regardless of whether a computer used in an attack is accessing the system via an API call, an application (such as a native app on a mobile operating system), a web browser, etc., the computer's IP address remains the same. For example, while an attacker can use a botnet, the IP address of each node in the botnet remains the same and each will be blocked in turn as the node performs a portion of a credential stuffing attack.

The present disclosure can trigger on more than just user identities and passwords, including any information used to validate asserted identities (for example, password, SSN, or phone number). For example, any unauthenticated location in the system where some credential is requested may be the subject of a credential stuffing attack. For example, an interface that allows for recovery of a forgotten username or a forgotten password may request provision of a phone number, Social Security number (SSN), etc. Triggers can therefore be configured for these items as well. For example, once a predetermined number of unrecognized phone numbers is presented by a certain IP address, that IP address is blocked. In other words, even if that IP address eventually presents a known phone number, the system will not return any indication that a corresponding username exists. Further, the IP address can be blocked if more than a predetermined number of unique values are presented. For example, if the IP address has presented more than a predetermined number of unique Social Security numbers, access can be blocked.

There may be certain IP addresses that are shared across a large number of users. For example, a financial data aggregator such as Mint or Yodlee may access a financial system using a wide variety of unique accounts. In addition, a large number of users may arrive via a corporate proxy. The IP addresses for some or all of these entities may be identified and added to a whitelist so that they are not blocked by the present system.

In FIG. 1, an authentication system 100 provides authentication for a client application 102. The client application 102 is exposed to the Internet 104 via a firewall 108. The client application 102 may allow users to perform a number of functions. For example, the client application 102 may be an email system, a financial account system, a social media system, etc. Each user of the client application 102 has a corresponding account in the authentication system 100. The authentication system 100 stores credentials for each account, such as username and password. The authentication system 100 may also store data used for multi-factor authentication, such as a user's shared secret for the time-based one-time password (TOTP) algorithm. The authentication system 100 or another system, such as a user database, may store other data, such as email address and phone number, about each user.

The client application 102 may be accessed by the user via a variety of client devices. As examples only, the client device may be a laptop computer 116 running a web browser through which the client application 102 is accessed. The client device may be a smartphone 120 accessing the client application 102 using a native mobile application. The client device may be a server 124 that accesses the client application 102 through an application programming interface (API) on behalf of a user. Other client devices (not shown) include wearable devices, digital personal assistance, and smart home speakers.

Each time a user attempts to authenticate to the client application 102, the authentication system 100 verifies the user's credentials and records information about the authentication attempt in an event cache 140. For example, the event cache 140 may include, for every authentication attempt, the date and time of the attempt, the originating IP address, a success or failure indicator, and optionally additional identifying information. In the case of a failure, the event cache 140 may record the type of failure, such as whether there was a credential mismatch or whether the identity of the user was not found. The identifying information may include, for a web request, header information such as a user agent string. In addition, the identifying information may include the provided identity.

An IP analyzer 150 includes an acquisition module 154 that gathers data from the event cache 140 for determining whether triggering events have occurred. For example, the acquisition module 154 may obtain a list of failed authentication attempts and a list, for each IP address, of unique usernames. The times of each of these events may also gathered from the event cache 140. The acquisition module 154 may discard data that is more than a predetermined period of time in the past. For example, any records over 24 hours in the past are deleted. Meanwhile, the event cache 140 may be a persistent data store for later analysis or forensics. In various implementations, the event cache 140 may maintain data for events within the past week, while older events are moved to cold storage, such as tape.

An analyzer module 158 reviews the data acquired by the acquisition module 154 to identify whether any attack signatures are triggered. If so, the offending IP addresses are stored into a block cache 162. In some implementations, additional or other actions than blocking may be performed; therefore, the block cache 162 may instead be referred to as an action cache or an action list.

The analyzer module 158 may also attempt to identify canary accounts used by an attacker to detect silent blocking of their credential stuffing attack. If the analyzer module 158 identifies such an account, that account is added to a canary cache 166. The standard authentication response can then be permitted in response to the canary account regardless of whether the IP address is otherwise blocked.

A whitelist 170 is maintained of IP addresses from which multiple account accesses may be expected. For such IP addresses, blocking may be disabled entirely. In other implementations, thresholds may be changed for IP addresses on the whitelist. For example, triggering based on unique identities may be disabled for the whitelisted IP addresses. In another example, the unique number of identities that would trigger an attack identification may be substantially increased, such as by an order of magnitude; the whitelist 170 may then be functionally connected to the analyzer module 158. In various implementations, the canary cache 166 and/or the whitelist 170 may be omitted.

A query module 174 services queries from the authentication system 100. In addition to verifying presented credentials, the authentication system 100 checks with the query module 174 to identify whether remedial action is associated with the IP address, such as that authentication by the IP address is currently blocked. The query module 174 may consult with the block cache 162, the canary cache 166, and the whitelist 170.

Figure 2:
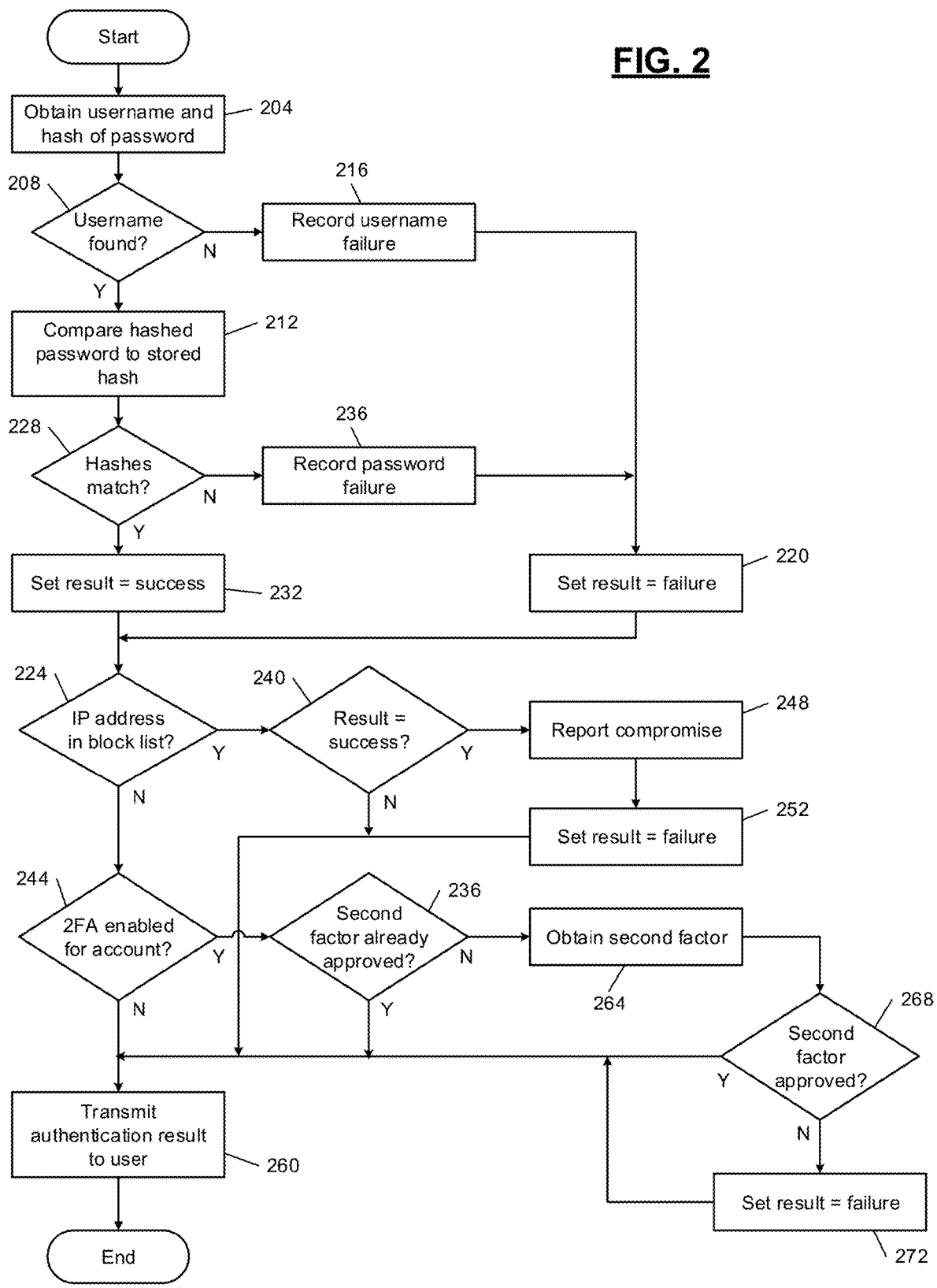
FIG. 2 is a flowchart depicting an example authorization process according to the principles of the present disclosure.

In FIG. 2, an example process performed by an authentication system such as the authentication system 100 of FIG. 1 is depicted. Control begins at 204 where a username (or other indicator of identity) and hash of a password is obtained from the user. At 208, control determines whether the username is found within the stored credentials. If so, control transfers to 212; otherwise, control transfers to 216. At 216, control records an event indicating the username failure and transfers to 220. At 220, control sets a result variable to the value failure and continues at 224.

At 212, control compares the hashed password to a stored hash for the found username. In various implementations, the stored hash may be salted using a value that is unique to the username. Control continues at 228 where, if the hash is a match, control transfers to 232; otherwise, control transfers to 236. At 236, control records a password failure event and continues at 220. At 232, control sets the result variable equal to the value success. Control continues at 224.

At 224, control determines whether the IP address of the user is in the block list. If so, control transfers to 240; otherwise, control transfers to 244. At 240, control determines whether the current value of the result variable is equal to success. If so, control transfers to 248; otherwise, control continues at 244. At 248, the authentication was successful even though the IP address is in the block list. This is an indication that an attacker may have valid credentials for an account. Therefore, this potential compromise is reported directly to the user and/or to an internal process or team for remedial action and analysis.

For example, the information about the otherwise-successful access may be written to an event log. A process may monitor the event log for such a failure and send the failure to one or more fraud teams for further investigation. If a fraud team believes that the event does represent a fraudulent attack, they can quickly de-authorize the user's access. In addition, the team can send the user an email message stating that their credentials appear to have been compromised, and that a call is required to reinstate access. In various implementations, de-authorization may be performed automatically to mitigate the risk as quickly as possible. Then the fraud team can re-enable the account if the algorithmically-identified attack appears to have been a false positive. Control continues at 252, where the value of result is changed to failure to avoid informing the supposed attacker of the valid credentials. Control then continues at 244.

At 244, control determines whether multi-factor authentication (such as two-factor authentication, 2FA) is enabled for the account. If so, control transfers to 256; otherwise, control transfers to 260. At 236, if the second factor has already been approved, control transfers to 260; otherwise, control transfers to 264. The second factor may already have been approved if the user is using the same browser on the same computer to access their account. The prior approval of the second factor may be indicated by device identifier stored within a cookie of the browser.

At 264, the second factor needs to be obtained and therefore control seeks the second factor from the user. For example, this may include transmitting a security code to the user via email or text or a phone call. Once the second factor is obtained, control continues at 268. If the second factor is approved, control transfers to 260; otherwise, control transfers to 272. At 272, since the second factor is not approved, control sets the result variable to failure. Control then continues at 260. At 260, control transmits the result of the authentication process to the user and control ends. If the result is a success, an Identity Token or other credential may be provided so that the user can access their account.

Figure 3:
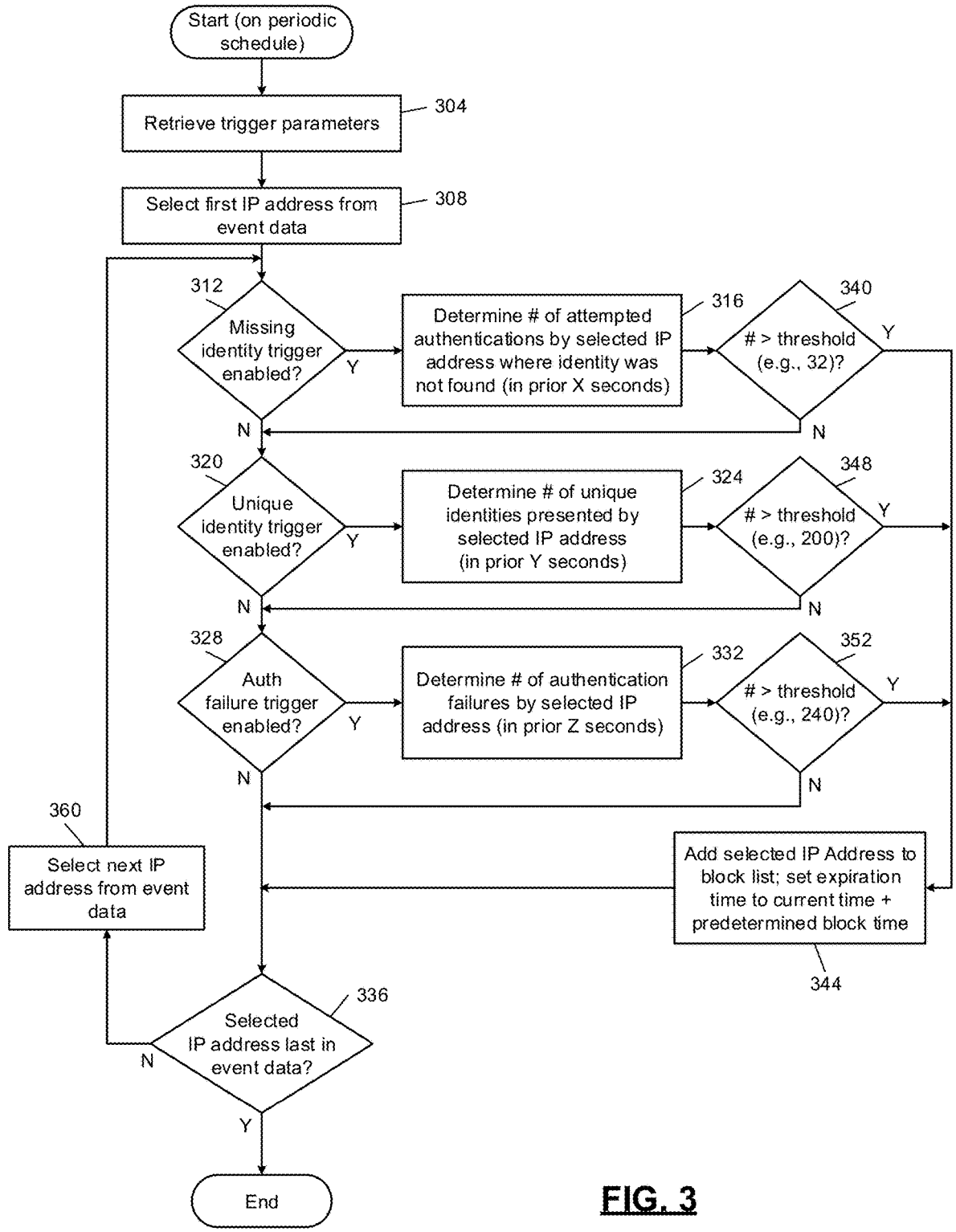
FIG. 3 is a flowchart of example pattern analysis to identify potential intrusions.

In FIG. 3, example IP analysis detects whether a presumed attack is ongoing. Control may begin on a periodic schedule, which may be user-defined. For example, the periodic schedule may initiate the process of FIG. 3 every 60 seconds. In other implementations, processing may be continuous such that control in FIG. 3 restarts as soon as the prior iteration ends.

Control begins at 304, where control retrieves trigger parameters. These trigger parameters may include times and thresholds used to identify attacks. In addition, the trigger parameters may determine whether certain triggers are enabled. At 308, control selects the first IP address from the event data. For example, this may be the IP address data obtained by the acquisition module 154 of FIG. 1. For example only, a data structure may store all of the unique IP addresses present within the event data. In other cases, the event data may be an unstructured list of events and therefore the first encountered IP address may be selected. Then, a queue of already-processed IP addresses may be maintained so that new unique IP addresses can be processed in each iteration.

At 312, control determines whether a missing identity trigger is enabled. If so, control transfers to 316; otherwise, control transfers to 320. At 320, control determines whether a unique identity trigger is enabled. If so, control transfers to 324; otherwise, control transfers 328. At 328, control determines whether an authentication failure trigger is enabled. If so, control transfers to 332; otherwise, control transfers to 336. While three triggers are shown in FIG. 3, more or fewer triggers may be defined and some or all of the defined triggers may be user-controlled to be either enabled or disabled.

At 316, to determine whether a missing identity trigger is present, control determines the number of attempted authentications, by the selected IP address, where the identity was not found. This determination is limited to the prior X seconds. For example only, X may be 600 (10 minutes). At 340, control determines whether the determined number is greater than a defined threshold. If so, control transfers to 344; otherwise, control transfers to 320. For example only, the threshold may be set to 32. In various implementations, multiple servers may process authentication requests and therefore a per-server value may be defined. For example, with eight servers, a per-server value of four leads to a total threshold of 32. Alternately the threshold may be set as a single value encompassing event counts across all servers. A threshold of 32 would then represent any combination of "per server" identity not found request counts across the total server farm vs an explicit per server number.

At 324, to determine whether a unique identity trigger event is present, control determines the number of unique identities presented by the selected IP address in the prior Y seconds. For example only, the value of Y may be equal to 180 (3 minutes). At 348, control determines whether the number is greater than a defined threshold. For example only, the threshold may be equal to 100. If the number is greater than the threshold, control transfers to 344; otherwise, control transfers to 328.

At 332, to determine whether an authentication failure trigger event is present, control determines the number of authentication failures by the selected IP address in the prior Z seconds. For example only, the value of Z may be 900 (15 minutes). At 352, control determines whether the number is greater than a defined threshold. If so, control transfers to 344; otherwise, control transfers to 336. For example only, the threshold may be set to 240.

At 344, control adds the selected IP address to the block list (or updates the selected IP address entry in the block list). Control sets the expiration time for the selected IP address in the block list to the current time plus a predetermined block time. For example, the predetermined block time may be 14,400 seconds (four hours). In various implementations, this setting of the expiration time will be performed even if the IP address already exists in the block address. In other words, the expiration time can continue to be extended if the attack from the IP address appears to be ongoing. Control then continues at 336.

At 336, if the selected IP address is the last remaining unique IP address in the event data, control ends; otherwise, control transfers to 360. At 360, control selects the next IP address from the event data and returns to 312.

Figure 4A:
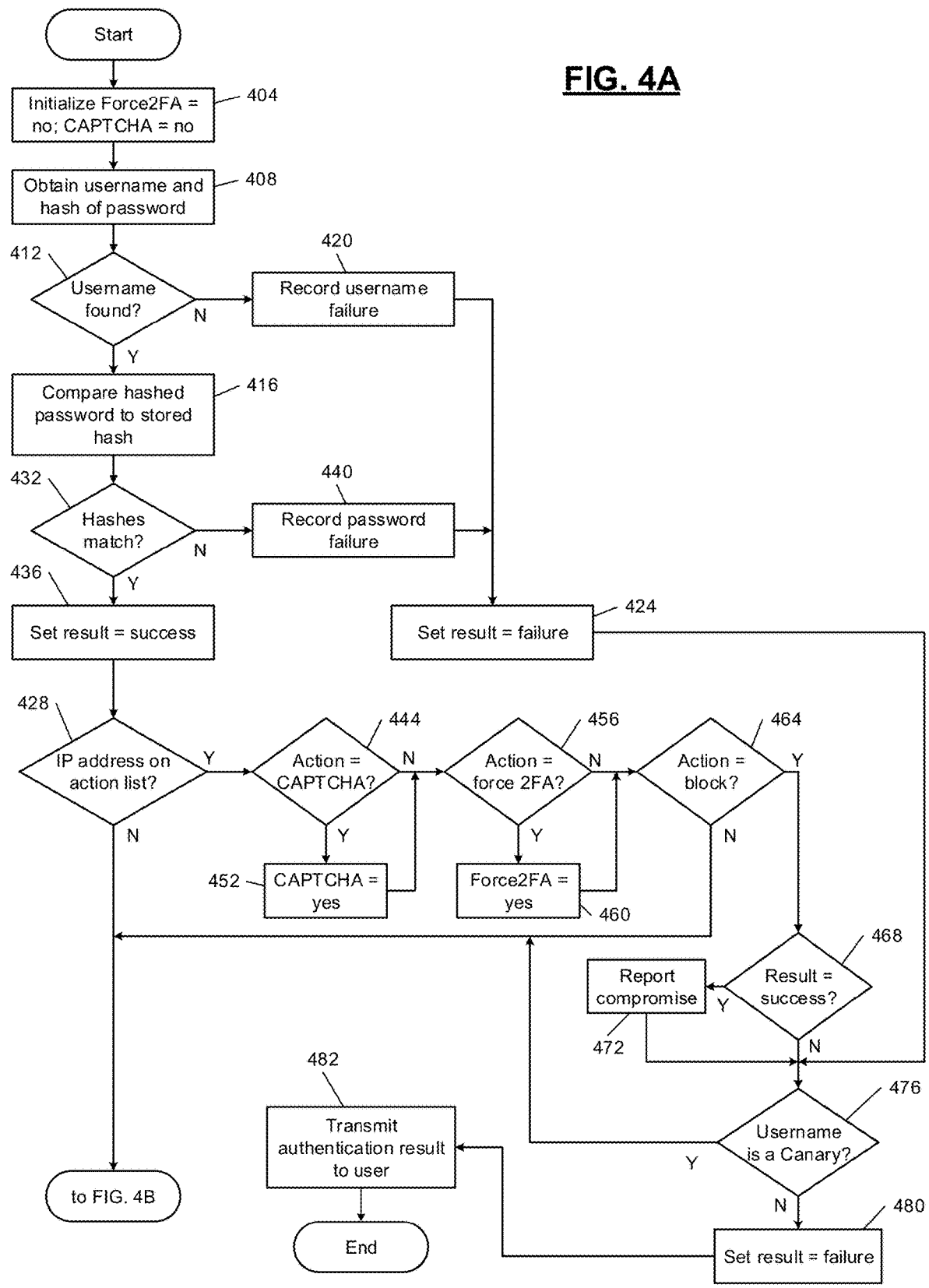
FIGS. 4A and 4B together are a flowchart of example operation of an authentication process with increased security controls.
Figure 4B:
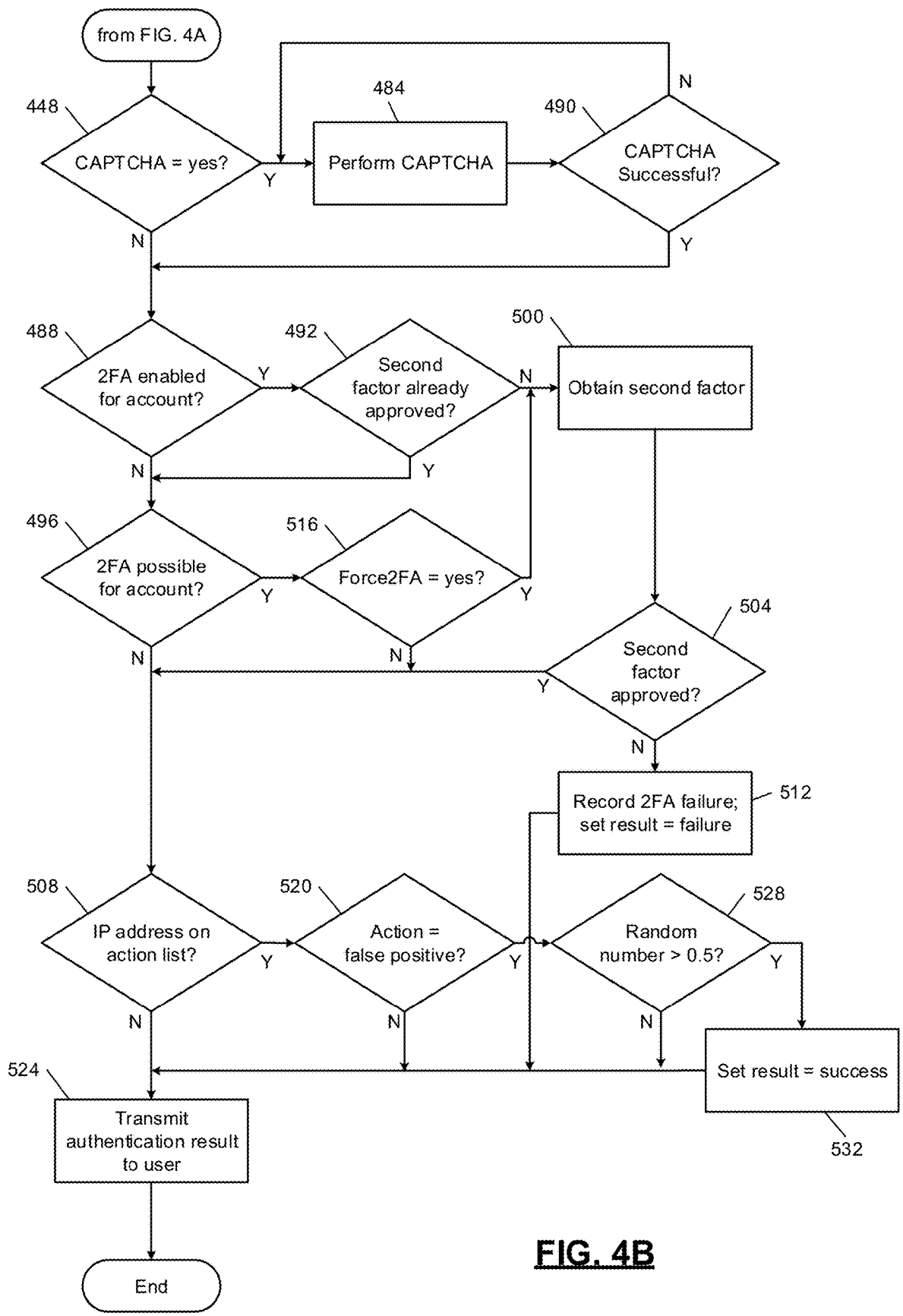

In FIGS. 4A-4B, a tiered authentication approach is shown. Beyond just blocking IP addresses, triggering events may also force CAPTCHA and two-factor authentication. Control begins at 404 when a user attempts to authenticate. At 404, control initializes a variable named Force2FA to a value of "no" and a CAPTCHA variable to a value of "no."

At 408, control obtains a username (or other form of identity) and a hash of a password. At 412, control determines whether the username is found. If so, control transfers to 416; otherwise, control transfers to 420. At 420, control records the username failure (also known as a missing identity failure) and transfers to 424. At 424, control sets a result variable to the value of "failure" and transfers to 476. At 416, control compares the hashed password to a stored hash for the user. At 432, control determines whether the hashes match. If so, control transfers to 436; otherwise, control transfers to 440. At 440, control records a password failure and transfers to 424. At 436, control sets the variable result to be equal to the value of "success." Control continues at 428.

At 428, control determines whether the IP address (from which the authentication request originated) is on the action list. If so, control transfers to 444; otherwise, control transfers to 448 in FIG. 4B. At 444, control determines what action or set of actions is specified for the IP address. In various implementations, the IP address may be associated with multiple actions. For example, forcing CAPTCHA, forcing two-factor authentication, and blocking the IP address may all be enabled for a particular IP address.

If, at 444, the action includes forcing CAPTCHA, control transfers to 452, where the value of CAPTCHA is set to "yes." In either case, control continues at 456. If the action includes forcing two-factor authentication, control transfers to 460 where the variable Force2A is set to "yes." In either case, control continues at 464. If, at 464, the action including blocking, control transfers to 468; otherwise, control transfers to 448 of FIG. 4B.

At 468, control determines whether the current value of result is equal to "success." If so, control transfers to 472 where a potential compromise is reported. In either case, control continues at 476. At 476, control determines whether the username has been identified as being a canary account. If so, control does not force the result to "failure" and instead proceeds directly to 448. However, if the username is not identified as the canary account, control transfers to 480. At 480, control sets the result variable the equal to "failure." Control then transmits the authentication result to the user at 482 and ends.

At 448, control determines whether the value of CAPTCHA is set to be "yes." If so, control transfers to 484; otherwise, control transfers to 488. At 484, control presents the user with a CAPTCHA challenge. At 490, if the user completes the CAPTCHA successfully, control continues at 488; otherwise, control returns to 484.

At 488, control determines whether two-factor authentication is enabled for the account. If so, control transfers to 492; otherwise, control transfers to 496. At 492, control determines whether the second factor has already been approved. If so, control transfers to 496; otherwise, control transfers to 500. The second factor may have already been approved in the case that the user is accessing the account from a web browser that stores a cookie indicating prior approval of the second factor. At 500, control obtains the second factor from the user, such as by sending an email, text message, or phone call. Control continues at 504, where control determines whether the second factor matches the transmitted value. If so, control transfers to 508; otherwise, control transfers to 512. At 512, control records the failure of two-factor authentication and sets the variable result equal to failure. Control then continues at 524.

At 496, control determines whether two-factor authentication is possible for the account. For example, two-factor authentication may be considered possible if the user has specified an email address or a mobile phone number, or if the user has a device bound to the client application on which an approval prompt can be presented. If two-factor authentication is considered possible, control transfers to 516; otherwise, control transfers to 508. At 516, control determines whether the value of Force2A is set to "yes." If so, control transfers to 500 to obtain the second factor; otherwise, control transfers to 508.

At 508, control determines whether the IP address is on the action list. If so, control transfers to 520; otherwise, control transfers to 524. At 520, control determines whether the action includes a false positive action. If so, control transfers to 528; otherwise, control transfers to 524. At 528, control generates a random number between zero and one, and if the random number exceeds a threshold, control transfers to 532; otherwise, control transfers to 524. For example, the threshold may be 0.5, meaning that transitioning to 532 will happen on average half the time. At 532, control sets the value of result equal to "success." Because this is performed randomly, this will overwhelm the attacker with false positives, introducing uncertainty into their data and preventing automation of credential stuffing. Control then continues at 524. At 524, control transmits the authentication result to the user and control ends.

Figure 5:
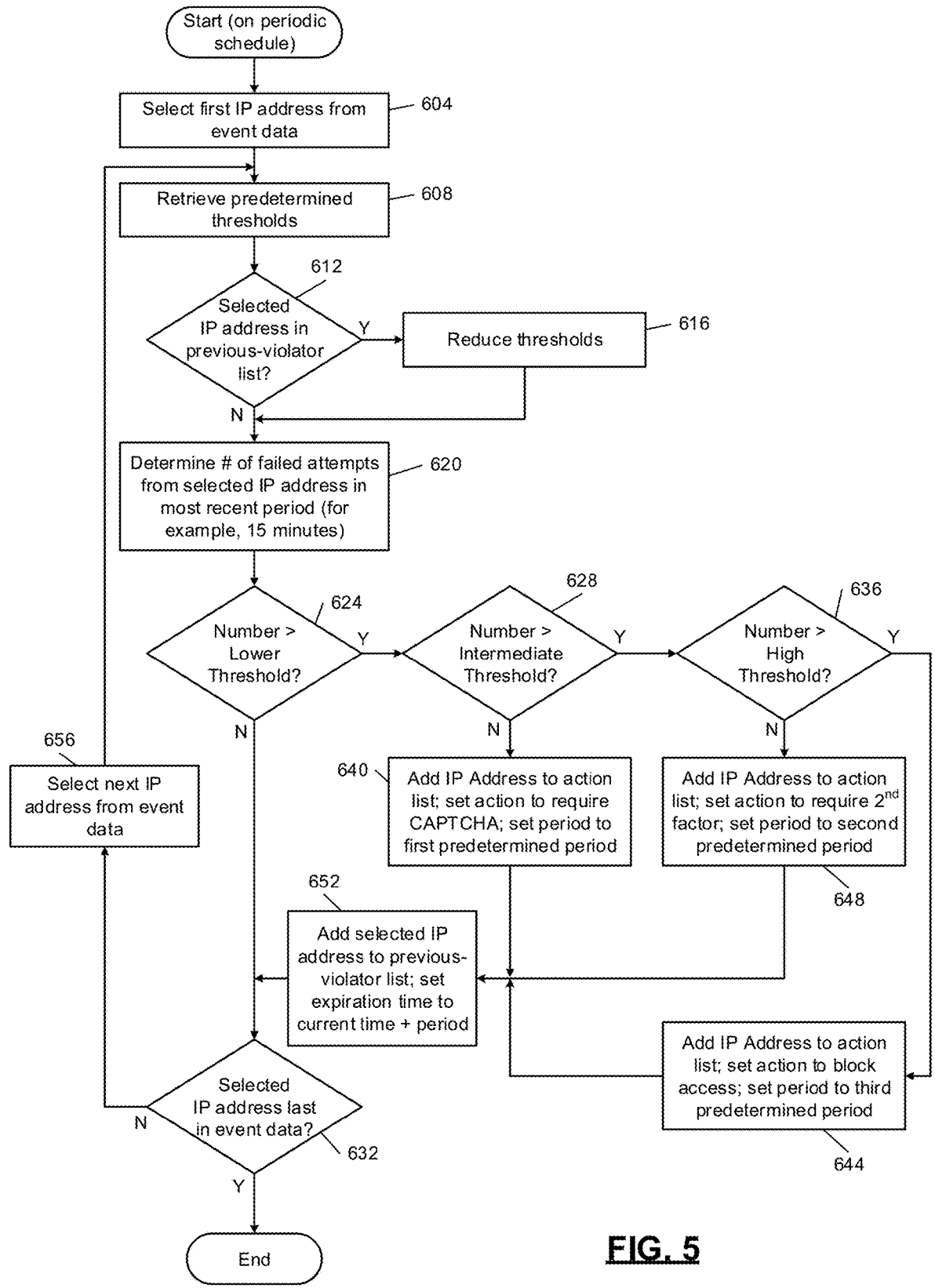
FIG. 5 is a flowchart of example pattern analysis for multiple levels of remedial action.

FIG. 5 presents an example of IP analysis that can be used for multiple tiers of response. Control begins on a periodic schedule at 604 where control selects the first IP address from obtained event data. Control continues at 608. At 608, control retrieves a set of predetermined thresholds. At 612, control determines whether the selected IP address is present in a previous-violator list. If so, control transfers to 616; otherwise, control transfers to 620. For example, the previous-violator list may be maintained for IP addresses that have previously been identified as sources of attacks. For example, this may indicate that these IP addresses are members of a botnet. At 616, control therefore reduces thresholds so that new attacks from known bad actors can be detected more quickly. Control then continues at 620.

At 620, control determines the number of failed authentication attempts from the selected IP address in the most recent period of time. For example, this recent period of time may be in the preceding 15 minutes. Although this particular metric is used for illustration in FIG. 5, additional or different metrics may be used in a multi-tiered analysis.

As an example, the predetermined thresholds obtained at 608 may include a lower threshold, an intermediate threshold that is greater than the lower threshold, and a high threshold that is greater than the intermediate threshold. At 624, control determines whether the number is greater than a lower threshold. If the number is greater than the lower threshold, control transfers to 628; otherwise, control transfers to 632. At 628, if the number is greater than the intermediate threshold, control transfers to 636; otherwise, control transfers to 640. As 636, if the number is greater than the high threshold, control transfers to 644; otherwise, control transfers to 648.

At 644, the number is greater than the high threshold and therefore the action for the IP address is set to block access. The IP address is added to the action list and a variable named "period" is set equal to a third predetermined period. Control then continues at 652. At 648, the number is greater than the intermediate threshold but less than the high threshold and therefore control sets the action to require a second factor. Control sets "period" to be a second predetermined period value. Control then continues at 652. At 640, the number is greater than the lower threshold but less than the intermediate threshold and control adds the IP address to the action list and sets the action to require CAPTCHA. Control sets "period" to be a first predetermined period value. Control then continues at 652.

At 652, control adds the selected IP address to the previous-violator list and sets the expiration time for the IP address in the action list of equal to the current time plus the variable. Control continues at 632. At 632, if the selected IP address is the last unique IP address in the event data, control ends; otherwise, control transfers to 656. At 656, control selects the next unique IP address from the event data and returns to 608.

Figure 6:
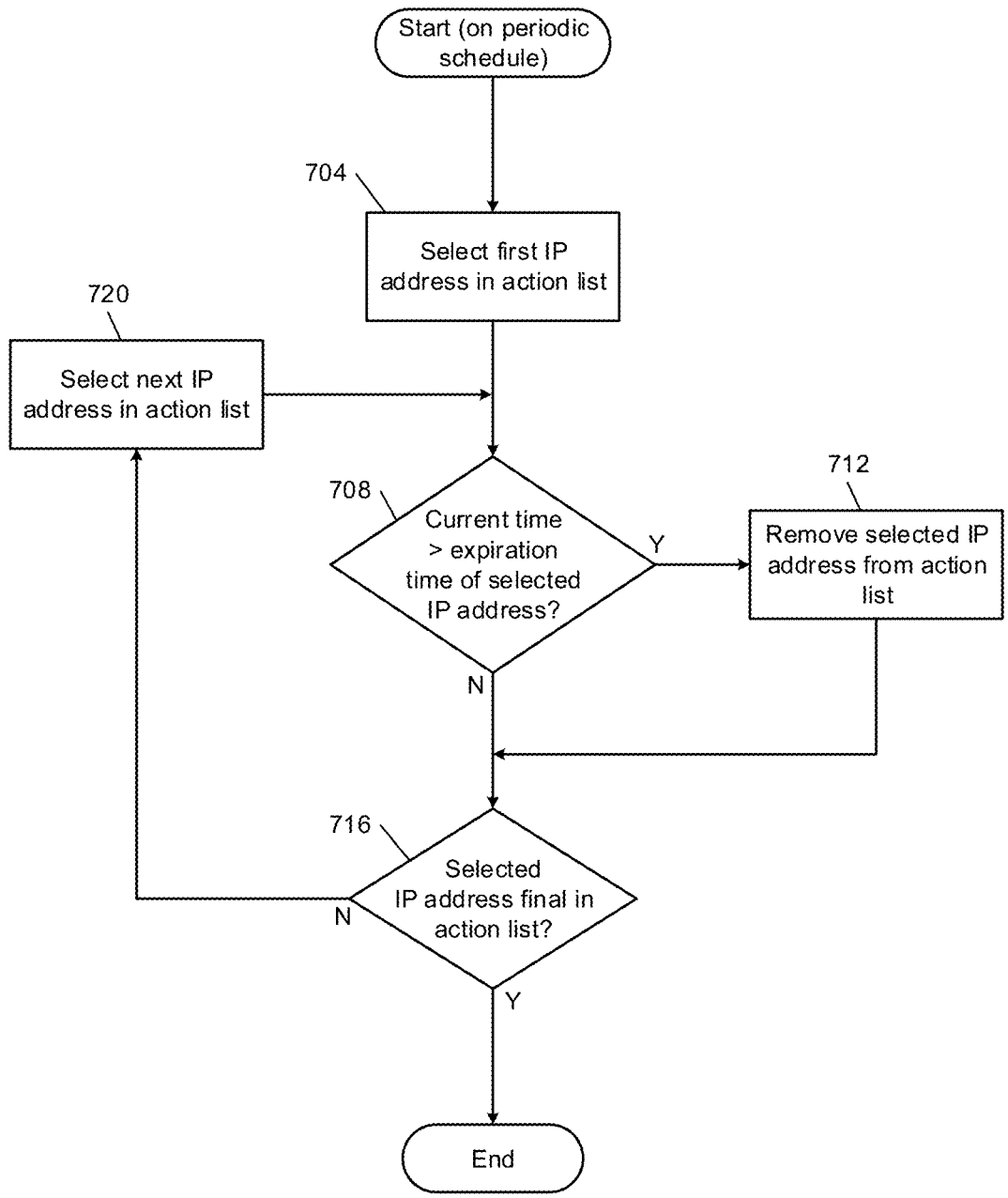
FIG. 6 is a flowchart of example pruning operation that allows blocks placed on IP addresses to expire.

In FIG. 6, control prunes the action list (or, block list) on a periodic schedule. For example, the pruning may be performed every 10 minutes. Control begins at 704, where control selects the first IP address present in the action list. At 708, control determines whether the current time is subsequent to the expiration time specified for the selected IP address. If so, control transfers to 712; otherwise, control transfers to 716. At 712, control removes the selected IP address from the action list. Control then continues at 716.

At 716, control determines whether the selected IP address is the final item in the action list. If so, control ends; otherwise, control transfers to 720. At 720, control selects the next IP address in the action list and returns to 708. In various implementations, the action list may include multiple actions for a single IP address; each action may be associated with a different expiration time. For example, requiring CAPTCHA may be set to expire after 24 hours while a block is set to expire after 4 hours. In these implementations, the pruning procedure of FIG. 6 will evaluate expiration times not only per-address but also per-action.

In various implementations, a similar pruning procedure may be performed for the previous-violator list described above. For example, an IP address may be removed from the previous-violator list after a certain number of days or weeks since the last attack was detected from that IP address. The previous-violator list may maintain a history of blocks being applied and present an IP address as being a previous violator if more than a certain number of blocks have been imposed over a predetermined period: for example, 6 blocks imposed over the preceding 14 days. In various implementations, blocks that overlap in time may be counted as a single instance of blocking.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules.

Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An authentication system comprising:
   an authentication module configured to,
      maintain a store of credentials for a set of users;
      receive an authentication request from a requestor address;
      in response to an identity specified by credentials provided from the requestor address not being found in the store of credentials, transmit an authentication failure response to the requestor address and record a failure event in an event cache, wherein the failure event indicates the requestor address and indicates an identity-not-found failure mode; and
      in response to the provided credentials matching selected credentials in the store of credentials, selectively transmit an authentication success response to the requestor address;
   an analyzer module configured to,
      analyze events in the event cache to determine a number of identity-not-found failures corresponding to a first address;
      identify a triggering event in response to the number of identity-not-found failures exceeding a threshold; and
      in response to the triggering event, add the first address to a block list; and
   a query module configured to, in response to a query from the authentication module for a specified address,
      determine whether the specified address is present in the block list; and
      in response to the specified address being present in the block list,
         if the credentials provided from the requestor address are not found in the store of credentials, instruct the authentication system to transmit the authentication failure response to the requestor address, and
         if the credentials provided from the requestor address are found in the store of credentials, instruct the authentication system to selectively transmit the authentication success response to the requestor address.

2. The authentication system of claim 1 wherein:
   the provided credentials include a username and a hash of a password; and
   the username specifies the identity for the provided credentials.

3. The authentication system of claim 1 wherein the number of identity-not-found failures related to the first address is restricted to those occurring in a period of time prior to the analysis.

4. The authentication system of claim 3 wherein the threshold and the period of time are configurable by an administrator.

5. The authentication system of claim 1 wherein the analyzer module is configured to:
   specify an expiration time when adding the first address to the block list; and
   in response to the expiration time being reached, remove the first address from the block list.

6. The authentication system of claim 5 wherein the expiration time is based on a sum of a time of the triggering event and a configurable block length.

7. The authentication system of claim 1 wherein the authentication module is configured to, in response to the provided credentials matching the selected credentials, record a success event in the event cache, wherein the success event includes the identity.

8. The authentication system of claim 7 wherein:
   the failure event indicates the identity; and
   the analyzer module is configured to, analyze events in the event cache to determine a number of unique identities presented by the first address; and selectively identify the triggering event in response to the number of unique identities exceeding a second threshold.

9. The authentication system of claim 8 wherein the analyzer module is configured to:
analyze events in the event cache to determine a number of unique identities presented by the first address within a time period; and
identify the triggering event in response to the number of unique identities within the time period exceeding the second threshold.

10. The authentication system of claim 1 wherein:
the authentication module is configured to, in response to the identity specified by the provided credentials being found in the store of credentials but the provided credentials failing to match any of the store of credentials, transmit the authentication failure response to the requestor address and record the failure event in the event cache, wherein the failure event indicates the requestor address and indicates a credential failure mode; and
the analyzer module is configured to,
analyze events in the event cache to determine a number of total failures corresponding to the first address; and
identify the triggering event in response to the number of total failures exceeding a second threshold.

11. The authentication system of claim 1 wherein the analyzer module is configured to reduce the threshold for the first address in response to the first address having been previously blocked.

12. An authentication method comprising:
Maintaining, at a memory hardware, a store of credentials for a set of users;
receiving, with a processor hardware, an authentication request from a requestor address;
in response to an identity specified by credentials provided from the requestor address not being found in the store of credentials, transmitting, with the processor hardware, an authentication failure response to the requestor address and recording a failure event in an event cache, wherein the failure event indicates the requestor address and indicates an identity-not-found failure mode;
in response to the provided credentials matching selected credentials in the store of credentials, selectively transmitting, with the processor hardware, an authentication success response to the requestor address;
analyzing events, with the processor hardware, in the event cache to determine a number of identity-not-found failures corresponding to a first address;
identifying, with the processor hardware, a triggering event in response to the number of identity-not-found failures exceeding a threshold;
in response to the triggering event, adding, with the processor hardware, the first address to a block list;
in response to a query for a specified address:
determining, with the processor hardware, whether the specified address is present in the block list; and
in response to the specified address being present in the block list,
if the credentials provided from the requestor address are not found in the store of credentials, instructing, with the processor hardware, the authentication method to transmit the authentication failure response to the requestor address, and
if the credentials provided from the requestor address are found in the store of credentials, instructing, with the processor hardware, the authentication method to selectively transmit the authentication success response to the requestor address.

13. The authentication method of claim 12 wherein:
the provided credentials include a username and a hash of a password; and
the username specifies the identity for the provided credentials.

14. The authentication method of claim 12 wherein:
the number of identity-not-found failures related to the first address is restricted to those occurring in a period of time prior to the analysis and
the threshold and the period of time are configurable by an administrator.

15. The authentication method of claim 12 further comprising:
specifying, with the processor hardware, an expiration time when adding the first address to the block list; and
in response to the expiration time being reached, removing, with the processor hardware, the first address from the block list.

16. The authentication method of claim 15 wherein the expiration time is based on a sum of a time of the triggering event and a configurable block length.

17. The authentication method of claim 12 further comprising:
in response to the provided credentials matching the selected credentials, recording, with the processor hardware, a success event in the event cache,
wherein the success event includes the identity.

18. The authentication method of claim 17 wherein:
the failure event indicates the identity; and
the method further comprises,
analyzing, with the processor hardware, events in the event cache to determine a number of unique identities presented by the first address within a time period; and
identifying, with the processor hardware, the triggering event in response to the number of unique identities presented within the time period exceeding a second threshold.

19. The authentication method of claim 12 further comprising:
in response to the identity specified by the provided credentials being found in the store of credentials but the provided credentials failing to match any of the store of credentials, transmitting, with the processor hardware, the authentication failure response to the requestor address and recording, with the processor hardware, the failure event in the event cache, wherein the failure event indicates the requestor address and indicates a credential failure mode;
analyzing, with the processor hardware, events in the event cache to determine a number of total failures corresponding to the first address; and
identifying, with the processor hardware, the triggering event in response to the number of total failures exceeding a second predetermined threshold.

20. The authentication method of claim 12 further comprising reducing, with the processor hardware, the threshold for the first address in response to the first address having been previously blocked.

21. The authentication system of claim 1 wherein in response to the specified address being present in the block list, the authentication system selectively transmits the authentication success response to the requestor address based on a random number and a reference value.

22. The authentication system of claim 21 wherein if the random number is less than or equal to the reference value, the authentication system transmits the authentication failure response to the requestor address and if the random number is greater than the reference value, the authentication system transmits the authentication success response.

23. The authentication system of claim 1 wherein in response to the specified address being present in the block list, the authentication system transmits the authentication success response to the requestor address in response to the credentials being present in a canary cache.

24. The authentication method of claim 12 wherein in response to the specified address being present in the block list, the authentication method selectively transmits the authentication success response to the requestor address based on a random number and a reference value.

25. The authentication method of claim 24 wherein if the random number is less than or equal to the reference value, the authentication method transmits the authentication failure response to the requestor address and if the random number is greater than the reference value, the authentication method transmits the authentication success response.

26. The authentication method of claim 12 wherein in response to the specified address being present in the block list, the authentication method transmits the authentication success response to the requestor address in response to the credentials being present in a canary cache.

* * * * *